United States Patent [19]

Hance

[11] 4,274,284
[45] Jun. 23, 1981

[54] EXPANDABLE PHASE CHANGE DETECTOR DEVICE

[75] Inventor: Richard J. Hance, Philadelphia, Pa.

[73] Assignee: Leeds & Northrup Company, North Wales, Pa.

[21] Appl. No.: 140,353

[22] Filed: Apr. 14, 1980

[51] Int. Cl.³ .............................................. G01K 13/12
[52] U.S. Cl. .................................... 73/354; 73/17 R; 73/359 R
[58] Field of Search ................. 73/354, 359 R, 359 A, 73/17 R, DIG. 9

[56] References Cited

U.S. PATENT DOCUMENTS

| Re. 26,409 | 6/1968 | Hance | 73/359 R |
|---|---|---|---|
| 3,267,732 | 8/1966 | Hance | 73/359 R |
| 3,546,921 | 12/1970 | Bourke et al. | 73/17 R |
| 3,748,908 | 7/1973 | Falk | 73/354 |
| 3,774,441 | 11/1973 | Dorst et al. | 73/359 R |
| 3,818,762 | 6/1974 | Kraus | 73/359 R |
| 3,844,172 | 10/1974 | Jeric | 73/359 R |

*Primary Examiner*—Donald O. Woodiel
*Attorney, Agent, or Firm*—Raymond F. MacKay; William G. Miller, Jr.

[57] ABSTRACT

An expendable phase change detector device is provided with an initial coating on the twisted wire forming the thermocouple junction which is, in turn, covered by a refractory coating during the manufacture of the device. The initial coating responds to an increased temperature to ablate the refractory coating from the thermocouple junction when molten metal is poured into the device.

6 Claims, 2 Drawing Figures

EXPANDABLE PHASE CHANGE DETECTOR DEVICE

BACKGROUND OF THE INVENTION

This invention relates to a device for obtaining a cooling curve of molten materials for the determination of the composition of the molten material by the thermal arrests occurring in the cooling curve.

U.S. Pat. No. RE 26,409 discloses an expendable phase change detector device for determining the composition of molten metal such as cast iron or steel by the measurement of thermal arrest by phase change detectors. As a sample of molten cast iron freezes, phase change or thermal arrest temperatures will correspond to the initial separation of austenite from the melt liquid (liquidus) and final solidification of the remaining liquid of eutectic composition (solidus). The device of No. RE 26,409 provided a liquidus arrest from which could be obtained the carbon equivalent value of hypoeutectic cast iron.

Subsequent to the invention of U.S. Patent No. RE 26,409, U.S. Pat. No. 3,546,921 issued to Bourke et al disclosed a method of producing an initial thermal arrest in the cooling of a molten sample of hypereutectic cast iron by introducing into the molten sample a stabilizing additive which retards primary graphite formation as the molten sample cools.

More recently there has been disclosed in a technical paper appearing in "Foundry Management and Technology" July 1974 entitled "Rapid Carbon Determination on the Shop Floor" by Alan Moore of the British Cast Iron Research Association (BCIRA) that the percent of carbon in hypoeutectic cast iron can be determined by measuring the temperature of the liquidus arrest and the temperature of the solidus arrest and taking the difference of these two temperatures. This technique requires the introduction of a stabilizing additive into the 30 molten metal which retards primary graphite formation as the molten sample cools.

In applying any of the foregoing techniques, it is important that the temperature of the molten sample be accurately measured at all times during its cooling and that nothing associated with the expendable phase change detector device introduce into the molten metal sample any contaminants and particularly no carbonaceous material.

SUMMARY OF THE INVENTION

In order to fulfill the requirement that the temperature measuring element in the expendable phase change detector device accurately measure the temperature of the molten metal sample poured into the device, it is important that the temperature sensing element have intimate thermal contact with the molten metal. In the manufacturing of expendable phase change detector devices, it is often found desirable to provide a refractory coating on the entire inner surface of the cup structure to seal any openings through which the molten metal sample might escape from the cup, such as around or through the structure holding the temperature sensing element within the cup and also to prevent the contamination of the molten metal sample by the materials from which the cup is constructed. In accomplishing this, the refractory coating generally covers all of the inner surfaces of the expendable phase change detector device including the primary sensing element which, in most cases, is a thermocouple junction. This refractory coating over the thermocouple junction produces a heat insulating coating that causes the thermocouple junction to be lagged so that the junction does not faithfully measure the existing temperature of the molten metal sample as it cools.

With the thermocouple junction so lagged, the thermocouple junction does not immediately respond to the temperature of the molten metal when it is initially poured into the expendable phase change detector device. Thus, the molten sample will have cooled appreciably as it loses heat to the relatively cool mass of cup structure before the temperature of the thermocouple junction itself rises to the temperature of the sample. If the refractory coating on the thermocouple junction is excessively thick, the temperature of the sample may fall below the temperature of the liquidus arrest before the thermocouple junction reaches the temperature of the sample. Obviously, such an arrangement precludes any determination of the liquidus arrest temperature and thus any determination of the composition of the molten sample.

Even though the temperature of the thermocouple junction reaches the temperature of the molten sample while the molten sample is above the liquidus arrest temperature, the temperature of the thermocouple junction at the thermal arrest temperature due to the lagging effect of the coating may not follow the temperature of the molten sample. In such a case, a plot of the temperature of the thermocouple junction vs. time may not produce a "plateau" at the liquidus arrest temperature but may merely show a change in slope in the cooling curve. With a mere change of slope in the time-temperature curve, it is difficult if not impossible for an operator to accurately select the liquidus arrest temperature from such a plot and makes more difficult the use of automatic equipment to select a plateau occurring at the liquidus arrest temperature.

Accordingly, it is the object of this invention to eliminate the lag between the temperature of the thermocouple junction and the temperature of the liquid molten sample by removing the refractory coating on the thermocouple junction when the molten metal sample contacts the thermocouple junction.

It is another object of this invention to coat the thermocouple junction with a temperature-sensitive ablating material before the refractory coating is applied to the inner surfaces of the expendable phase change detector device so that the refratory coating covering the thermocouple junction is ablated from the thermocouple junction to expose the thermocouple junction to the molten metal sample when the sample is poured into the expendable phase change detector device.

DETAILED DESCRIPTION OF THE PREFERRED EMBODIMENT

Figure 1:
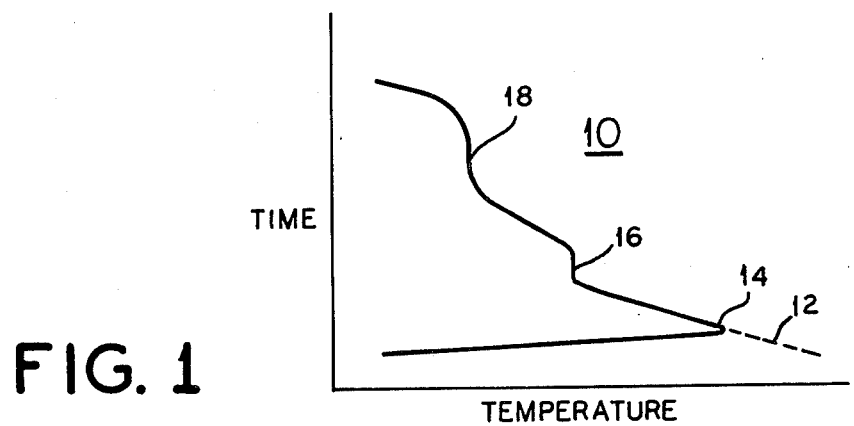
FIG. 1 is a plot of temperature vs. time of a molten metal sample as the molten metal cools.

In FIG. 1 there is disclosed a typical plot 10 with temperature as the abscissa and time as the ordinate showing a cooling curve obtained by an expendable phase change detector device. When the molten metal is poured into the device, the temperature of the temperature sensing element rapidly rises from its ambient temperature toward the temperature of the molten metal sample. During the time that the temperature of the thermocouple is rising, the temperature of the molten metal sample is cooling, as shown by dashed line 12, from its original temperature by virtue of the cooling effect of the mass of the expendable phase change detector device. The temperature of the thermocouple junction reaches the temperature of the molten metal sample at the turnaround point 14 and thereafter follows the temperature of the molten metal sample through its liquidus arrest plateau shown at 16 and its solidus arrest plateau 18. It will be recognized by those skilled in the art that the temperature represented by the plateau 16 is uniquely related to the carbon equivalent of a cooling sample of cast iron or steel and that the temperature difference between the plateau 16 and plateau 18 will represent the percent carbon in a hypoeutetic cast iron sample if a carbide stabilizer is added to the molten cast iron. It will be recognized that if the thermocouple junction is highly lagged, the temperature of the molten metal sample will cool much further before the temperature of the thermocouple junction reaches the temperature of the sample. Also, the plateau 16 occurring at the liquidus arrest and the solidus arrest plateau 18 will not display a constant temperature but rather will display an arrest or plateau in which the temperature of the thermocouple junction slowly changes. The slowly decreasing temperature during the thermal arrest provides no fixed temperature that can be used in identifying a carbon equivalent or a percent carbon.

Figure 2:
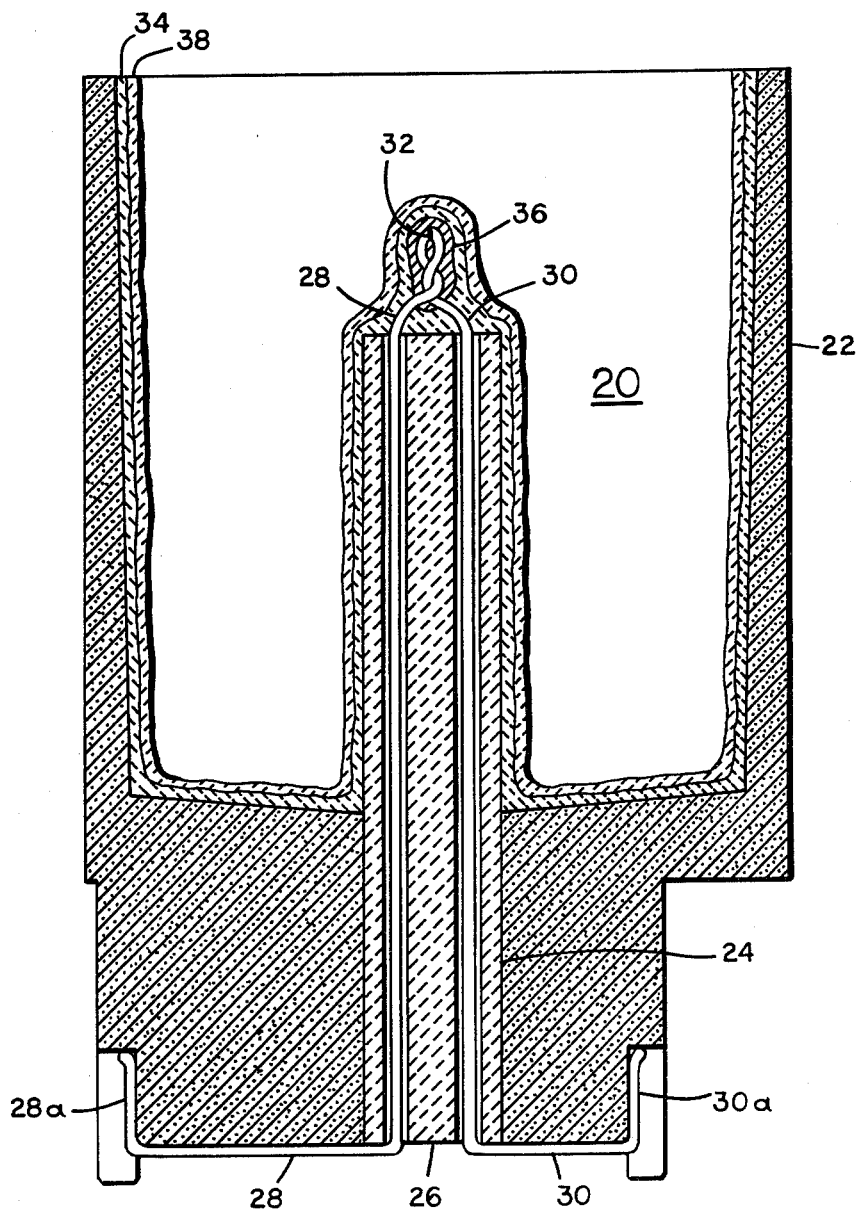
FIG. 2 is a cross-sectional view of an expendable phase change detector device utilizing the invention.

FIG. 2 discloses an expendable phase change detector device 20 which is basically the same as disclosed in FIG. 3 of my prior U.S. Patent, No. RE 26,409, with certain changes in physical arrangements and electrical contact provisions. The expendable phase change detector device 20 is comprised of a cup-shaped structure 22 formed from a monolithic mass of sand and a resin binder. The cup-shaped structure 22 is provided with an opening 24 into which is inserted a two-hole insulator tube 26 made of any suitable high temperature refractory material as, for example, mullite. Extending through the holes of the insulator tube 26 are a pair of thermocouple wires 28 and 30 that are twisted together at the distal end of the two-hole insulator tube 26 to form a thermocouple junction 32. Typically the thermocouple wires 28 and 30 are Chromel-Alumel wires when the molten metal to be analyzed is cast iron. The other ends of the thermocouple wires 28 and 30 extend outside of the expendable phase change detector device 20 and provide electrical contact portions 28a and 30a for connecting the thermocouple junction 32 into a temperature measuring circuit, not shown, of a suitable measuring device to display and/or automatically record the temperature measured by the thermocouple junction 32 for automatic plotting of a cooling curve such as that shown in FIG. 1. It will be noted from FIG. 2 that the contact portions 28a and 30a are unsymmetrically located with respect to the body portion of the expendable phase change detector device 20 to provide for insertion of the expendable phase change detector device 20 into an appropriate holder, not shown, with proper electrical polarity for the measurement of the voltage output of the thermocouple junction 32.

As shown in FIG. 2, and in accordance with common practice in the manufacture of expendable phase change detector devices, a refractory cement such as Alundum is coated on the inner surfaces of the cup-shaped structure 22 to form a coating 34 covering not only the inner surfaces of the cup-shaped structure 22 but also the two-hole insulator tube 26, the thermocouple wires 28,30, and the thermocouple junction 32. This coating 34 serves to seal any gaps occurring between the opening 24 in the cup-shaped structure 22 and the two-hole insulator tube 26. It also serves to seal the spaces between the thermocouple wires 28 and 30 and the holes in the insulator tube 26. These seals prevent leakage of the molten sample from the cup-shaped structure 22 to prevent damage to the holder for the expendable phase change device 20 and to prevent false readings that would be produced if the molten metal sample should enter the holes in the insulator tube 26.

It has been found that the cup-shaped structure 22 may be relatively thin and still provide adequate strength for receiving the molten metal sample. In view of this, the cup-shaped structure 22 may be produced by shell molding as taught in my prior U.S. Pat. No. RE 26,409. In shell molding, a thin shell mold is produced by covering a hot metal pattern or dye with a mixture of sand and a resin binder. The resin binder is heat setting such as phenol-formaldeyhde resin binder. The thin shell mold may be produced in various ways, one of which is by blowing the sand and resin into the dye cavity and the thin mold so formed is then capable of being hardened completely by heating. The refractory coating 34 not only serves to seal the device 20 against leakage, but also provides an inert coating on the surfaces of the shell molding so that there is avoided any contamination of the molten metal sample by the resins used in the resin binder of the shell molding.

In order to avoid the adverse effects associated with the refractory coating 34 over the thermocouple junction 32, there is first applied to the thermocouple junction 32 an ablating material 36 before the refractory coating 34 is applied. The ablating material 36 may be of any material that will, when subjected to elevator temperature, cause the refractory coating 34 to ablate from the thermocouple junction 32. Suitable ablating materials include low temperature boiling point hydrocarbons including lacquer, shellac, wax, or grease. Alternatively, materials having large coefficients of thermal expansion such as glass or low boiling point metals such as tin may be used. A further material to provide a temperature induced ablating action would include materials that react with volatile products such as a mixture of saltpeter and sulphur, or hydrated compounds such as hydrated calcium chloride. It will be recognized by those skilled in the art that all of the above materials will, in response to an increased temperature, cause the refractory coating 34 to ablate from the thermocouple junction 32 by virtue of its volatilization, by large thermal expansion, or by a reaction.

Where the expendable phase change detector device 20 is to be used in determining the carbon equivalent of hypereutectic cast iron in accordance with the teachings of U.S. Pat. No. 3,546,921 or the direct determination of carbon from hypoeutectic cast iron in accordance with the BCIRA method, an additional thin wash coat 38 of Alundum containing tellurium particles is applied to the inner surfaces within the cup 22 and covers the refractory coating 34 previously referred to.

When molten cast iron or other high temperature molten metal is poured into the expendable phase change detector device 20, the ablating material 36, if of a low boiling point material, volatilizes and forces the coating 34 and wash coat 38 off of the surfaces of the thermocouple junction 32 in order that the temperature of the thermocouple junction 32 will precisely follow the temperature of the molten material in the cup 22 as the sample cools. Alternatively, if the ablating material 36 is selected from material having a large thermal coefficient, the expansion of that material will cause the ablating of the coatings 34 and 38 to expose the thermocouple junction 32 to the molten material within the cup 22. In similar fashion, if the ablating material 36 is a mixture of saltpeter and sulphur, it will be understood that the extreme volatility of the mixture will force the refractory coating material 34 and the wash coat 38 away from the thermocouple junction 32.

In practice it has been found that the turnaround point 14, FIG. 1, occurs at a temperature at least 30° F. higher when the ablating material 36 is used in the manufacture of the expendable phase change detector device 20 as compared to the temperature when the ablating material 36 is not present. This temperature difference is particularly significant when the temperature of the molten metal sample is only slightly above the liquidus arrest temperature when it is poured into the device 20. In such cases, the presence of the ablating material 36 may make the difference between a successful and an unsuccessful test.

It is general practice in the manufacture of expendable phase change devices 20 to apply the refractory coatings 34 and 38 by filling the cup 22 with an aqueous slurry of particulate refractory material. The cup 22 is then normally inverted to permit the slurry to drain from the cup 22 leaving a continuous, smooth, break-free integral coating over the entire interior of the cup 22 and the thermocouple structure including the two-hole insulator 26 and the thermocouple junction 32. In this step of the manufacturing process, it will be understood that the thickness of the coating 34 and 38 will depend in large measure upon the consistency of the slurry. Heretofore, it has been important that the slurry be of such a consistency that the coating on the thermocouple junction 32 will be thin so as not to produce excessive heat lag between the temperature of the molten material in the cup 22 and the temperature of the thermocouple junction 32. With the present invention, however, the consistency of the aqueous slurry need not be precisely controlled because the coatings 34 and 38 over the thermocouple junction 32 are automatically ablated or removed by the action of the ablating material 36 when the molten metal sample is poured into the device 22. Thus, the invention not only improves the ability of the thermocouple junction 32 to follow the actual temperature of the molten material sample as its cools to produce a more useful cooling curve, but also makes the process of manufacture less critical with respect to the consistency of the aqueous slurry, which influences the thickness of the coatings 34 and 38.

While FIG. 2 discloses a presently preferred embodiment, it is understood that the present invention may be utilized in other forms within the scope of the following claims.

What is claimed is:

1. An expendable phase change detector device for determining the composition of molten metal by thermal analysis, comprising:
   a cup,
   a thermocouple junction located in a central area of said cup,
   a refractory coating covering said thermocouple junction, and
   means responsive to the temperature of said thermocouple junction for ablating said refractory coating from said thermocouple junction when molten metal to be analyzed is poured into said cup and contacts said refractory coating on said thermocouple junction.

2. A device as claimed in claim 1 in which said last named means is a material located on said thermocouple junction under said refractory coating which material produces a pressure within said coating to ablate said refractory coating at said thermocouple junction.

3. A device as claimed in claim 2 in which said material is a hydrocarbon having a low temperature boiling point.

4. A device as claimed in claim 2 in which said material has a large temperature coefficient of expansion.

5. A phase change detecting device for determining the composition of molten metal comprising:
   a cup,
   temperature sensing means located in a central area of said cup,
   a coating covering said temperature sensing means,
   means responsive to the temperature of said temperature sensing means for ablating said coating from said temperature sensing means when molten metal to be analyzed is poured into said cup and contacts said temperature sensing means.

6. An expendable phase change detecting device for determining the composition of a molten metal comprising:
   a cup having an opening through its end wall,
   a two-hole insulator axially mounted in said cup through said opening in said end wall of said cup and terminating in a central portion of said cup,
   a pair of thermocouple wires passing respectively through said two holes of said two-hole insulator,
   a thermocouple junction formed in said central portion of said cup by twisting together said thermocouple wires beyond the termination of said two-hole insulator,
   a temperature responsive ablative material applied to said thermocouple junction, and
   coating means containing a carbide stabilizer applied to all of the surfaces within said cup, including said two-hole insulator and said thermocouple junction.

* * * * *